United States Patent [19]

Leibig

[11] Patent Number: 4,664,716

[45] Date of Patent: May 12, 1987

[54] SYSTEM FOR EXTRACTION OF SOLUBLE MATTER FROM FIBROUS MATERIAL

[75] Inventor: Wilhelm Leibig, Riva, Md.

[73] Assignee: Voith S/A - Maquinas e Equipamentos, Brazil

[21] Appl. No.: 636,964

[22] Filed: Aug. 2, 1984

[51] Int. Cl.[4] ............................................. C13D 1/12
[52] U.S. Cl. ...................................... 127/6; 100/75; 100/121; 127/8; 127/43
[58] Field of Search ........................... 127/5, 6, 8, 43; 162/40, 56, 60; 100/75, 121

[56] References Cited

U.S. PATENT DOCUMENTS

| 2,826,306 | 3/1958 | Burns | 210/114 |
| 4,043,832 | 8/1977 | Leibig et al. | 127/6 |
| 4,310,361 | 1/1982 | Georget | 127/5 |

OTHER PUBLICATIONS

Perry, R. H., Chilton, C. H., Chemical Engineers' Handbook, 5th Edition, 1973, pp. 5-16 to 5-17.

Primary Examiner—Richard V. Fisher
Assistant Examiner—W. Gary Jones
Attorney, Agent, or Firm—Ostrolenk, Faber, Gerb & Soffen

[57] ABSTRACT

A system for extracting soluble substances from fibrous material by lixiviation is followed by various steps of compression and maceration exerting moderate compression on the fibrous material up to 14 Bar. Hereby, special arrangements are made to saturate the fibrous material to maximum absorption between each pressure application. Moisture content of the spent fibrous material is reduced with a special roller assembly with the application of low and high pressure. Heat is used to facilitate the extraction process and to suppress biological alterations of matter involved. With heat exchange between raw material and extracted solvent, overall heat economy is improved. Fibrous material is used as filter aid to reduce contamination of extracted solvent with foreign matter. The system is particularly suitable for the extraction of sugar from sugar cane.

11 Claims, 6 Drawing Figures

//  4,664,716

SYSTEM FOR EXTRACTION OF SOLUBLE MATTER FROM FIBROUS MATERIAL

FIELD OF INVENTION

This invention is covering a new process for the extraction of soluble substances from sub-divided, fiberous materials as exemplified by the extraction of sugar from sugar cane. The process is utilizing a combination of components permitting the application of lixiviation, low-pressure and maceration, and finally dewatering of residual fiber. The system is able to achieve highest extraction in comparison with the processes actually in use, utilizing a rather simplified process which can be realized with lower capital investment and is operating more economically.

BACKGROUND TO INVENTION

Existing commercial processes for removing sugar from sugar cane may be classified generally as tandem mill processes or diffusion processes. In tandem mill processes, the fiberized cane is repeatedly subjected to high pressure, usually in the range of 200 to 300 kg/cm² in order to separate the sugar juice from the cane. In diffusion processes, solvent is allowed to percolate through a bed of fiberized cane by gravitational flow to extract soluble substances like sugar solution by lixiviation. Many modifications of the foregoing processes have been made. For example, the imbibition liquid is ordinarily utilized in mill tandem processes; and with it, maceration has been applied to a limited extent to improve extraction efficiency.

Basically, the improvements in mill tandem processes have been made in direction of using equipment able to exert increasingly higher pressures on the cane with the objective to obtain improved extraction results. Such measures have resulted in increased power requirements accompanied with increased costs for maintenance and overall operational expenses.

The high pressure utilized in conventional mill tandems allows for only a small maceration rate due to the fact that juice extraction on the front end of a mill tandem utilizing high pressure restricts the amount of maceration. If higher maceration rates could be possible in such mill tandems, the poor drainage capacity of a conventional 3-roller mill would be restrictive.

A moisture content in bagasse higher than 70% by weight creates severe feeding problems and consequently impairment of mill performance. To overcome this deficiency, many devices have been developed in the past in an attempt to improve the feeding of wet bagasse to high pressure mills but with only limited success. For this reason, tandem mill processes using high pressure and utilizing force-feeding devices are making such equipment only applicable to fiberous materials having a relatively low moisture content.

In addition to technological problems explained above, any increase of the volume of solvents must lead to an undesirable dilution of the extraction fluid leaving the process, which in turn must cause an increase of the energy consumption for thermophysical processes as required for sugar or alcohol production.

Sugar cane harvesting methods are tending toward more utilization of mechanical equipment, which in turn is carrying more foreign matter into the extraction process causing increased wear and with it increasing maintenance costs, particularly when high pressure mills are in use. Under such circumstances, the average performance of a mill tandem in view of capacity, extraction, and overall operation costs can be substantially impaired.

During the last 2 decades, diffusion processes have been devised with the objective to replace mill tandems with their obvious technological deficiencies. Diffusion processes require comparatively more complex and expensive equipment than the mill tandem processes; and, therefore, they have proven to be particularly feasible for sugar extraction plants having high manufacturing capacities. Extraction efficiency obtained with diffusion processes can be higher than for mill tandems; and, therefore, their implementation for many operations is justifiable.

Since lixiviation is the basic method in a diffusion system (diffusion is not the appropriate technical term), the cane must be specially prepared; and the extraction process is rather time consuming requiring 40 to 60 minutes. Heat is applied to the system, and the process temperature is ideally 76° C. with the objective to accelerate lixiviation and to prevent adverse bacteriological changes which may effect the solvents and fiberous material during the time period needed for the extraction process.

Nevertheless, exposure of all the materials involved is causing some destruction of the extractable solubles, inversion, and a drop in the pH: phenomenon which must be thermally and chemically controlled. Continuous operation of a diffusion system is essential; and interruption of this process, even for a short time period can cause a substantial impairment of the extraction result. The rate of lixiviation is closely related to the flow rate of the solvents through the fiberous material; and the respective percolation rate can be kept only on a high level when continuous operation is assured.

SUMMARY OF OBJECTIVES OF THE INVENTION

It is an objective of the invention to provide a novel extraction system for removing soluble substances from fiberous materials and which is adapted to extract sugar from sugar cane.

It is another objective of the invention to provide an extraction system for fiberous materials allowing a high degree of lixiviation and concomitantly a low extraction time practicable for continuous operation.

It is another objective of the invention to provide for effective removal of the soluble material from the fiberous material using lixiviation in combination with the application of heat.

It is another objective of the invention to use heat to check biological alterations of solvent and fiberous materials.

It is another objective of the invention to use the components designed for lixiviation and the introduction of heat as filtering device to obtain a solution for extraction with a minimum of contamination with foreign matter, which is introduced with the raw material.

It is another objective of the invention to use the lixiviation device for a heat exchange between the solution to be extracted and the raw material introduced to the process, providing with this the premises for improved energy management in the following thermophysical processes.

It is another objective of the invention to provide for efficient removal of juice from fiberous material without the use of high-pressure rolls at a series of stations in the extraction operation by the use of low-pressure equipment attended by efficient drainage of the extraction juice.

It is another objective of the invention to provide for conveyor systems between the low-pressure devices permitting a high amount of maceration of the fiberous material between the pressure steps; and concomitant therewith, the extraction time required can be substantially reduced.

It is another objective of the invention to combine a special pressing device with the last high-pressure mill for final dewatering of the fiberous material making the operation of said mill more efficient by lowering moisture content of the fiber from its entrance and by the application of force feeding.

It is another objective of the invention to provide an extraction operation that is economical in its installation and operational costs requiring a minimum of maintenance.

It is yet another objective of the invention to provide an extraction operation that is flexible, able to supplement existing facilities, usable in combination with a diffuser in order to improve its extraction efficiency, or that can be used for the modification of high-pressure mill systems, or that can be used entirely for new installations.

It is yet another objective of the invention to provide an extraction operation that has low power and heat requirements for its operation.

Further objectives and advantages of this system will be apparent to one skilled in this field from the following description and accompanying drawings.

DESCRIPTION OF PREFERRED EMBODIMENT

Figure 1A:
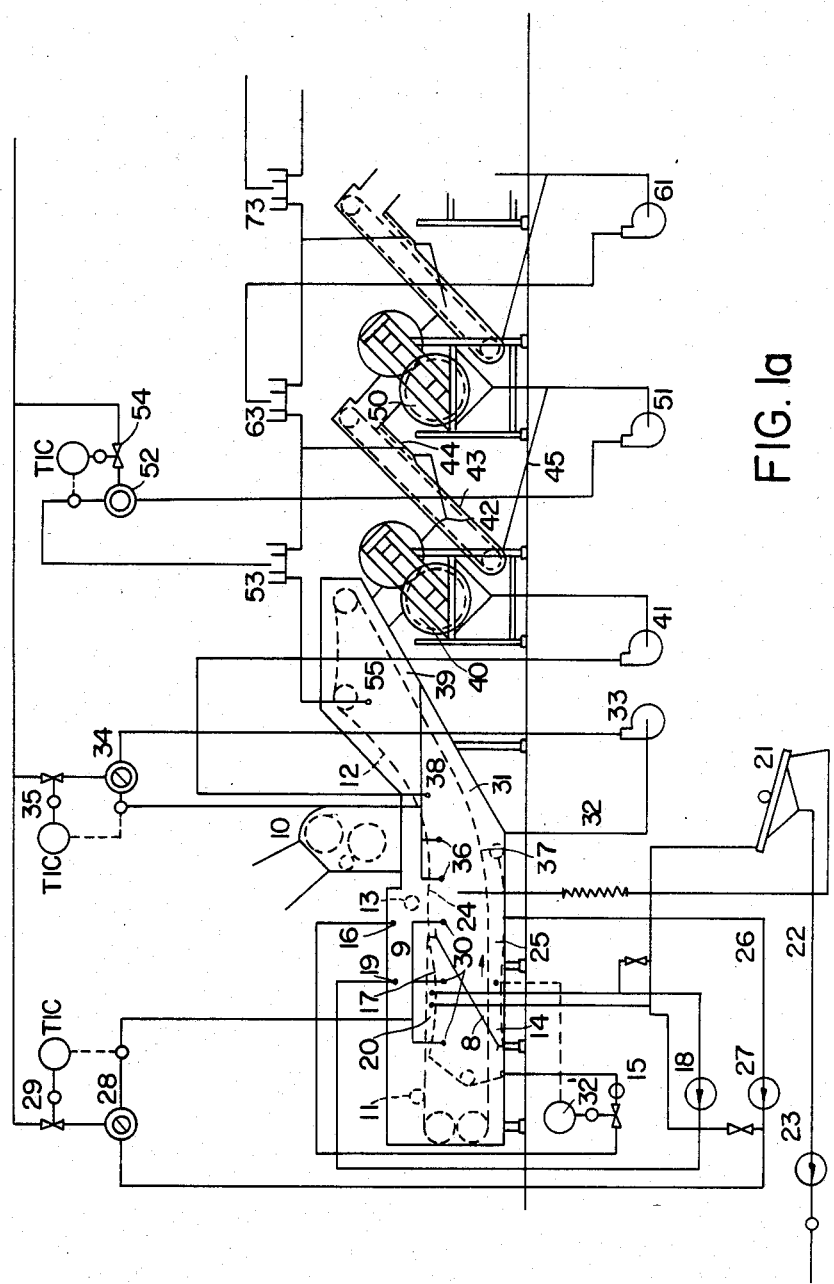
FIGS. 1a and 1b are showing a flow sheet diagrammatically illustrating the extraction operation of the invention.

The invention relates to the extraction of soluble substances from sub-divided, fiberous materials as exemplified by the extraction of sugar from sugar cane.

Experience obtained from the operation of diffusion and mill tandems shows that with the application of lixiviation as basically used in so-called diffusion processes a substantial part of the soluble materials can be extracted without the application of compression to the fiberous material. It is well-known that the soluble matter contained in the cell plasma of said fiberous material can easily be removed with such a process. However, it is then required that a high percentage of the cell walls in this fiberous material are ruptured to allow for such a lixiviation process.

Since cane preparation of the fiberous material for the above-mentioned process and with it rupture of cell walls cannot be completely achieved, it is necessary to apply a process permitting extraction of soluble materials by means of displacement by compression, which in turn requires application of pressure. This displacement process can be further improved with the application of maceration, which is taking place before and after each pressing and displacement step of the system. It is further important that the maceration rate is as high as possible, since the displacement and maceration phases are correlated, and the amount of solvent material involved is most important for the extraction result. The amount of solvent or liquid in this process must be considered as a basic carrier of soluble materials; and for this reason, application of pressure alone—even the highest pressure—without maceration cannot yield satisfactory extraction results.

Some application of high pressure in the extraction system is necessary however to recover a maximum of juice from the fiberous material before it leaves the process and to reduce the moisture content of said fiberous material to a practical value so that it can be used for other purposes, in particular as fuel with the best possible heat potential.

With the preferred embodiment, it is possible to obtain an operation for the extraction of fiberous material, in particular the extraction of sugar from sugar cane with the application of lixiviation, followed by a displacement process, supplemented with maceration, and utilizing increased pressure. Hereby, a fiberous material leaving the process can be obtained with a moisture content that makes this material suitable as fuel. The lixiviation phase at the front part of this process allows for the introduction of heat to improve lixiviation and to check biological alterations during the process; it is therefore nominated as scalding device. This apparatus is also used due to special technical features to yield an extracted solvent with a minimum of contamination of foreign matter, which may be introduced with the prime material. This device is also allowing for the possibility to exchange heat between the solvent fluid leaving the extraction device and the prime material entering the process.

To establish lixiviation and to maintain the hereto necessary liquid flow rates through the fiberous material, a number of circulating flows are used which are also interacting with heat exchangers to introduce the necessary heat to the process. Special arrangements are also made for the control of the extracted solvent from the process and to make solvent fluid available for the maceration of incoming prime material under all working conditions. The scalding device is furthermore arranged to avoid extraction of solvent fluid from the system in case that the scalding device is not fed with prime material, suppressing dilution and contamination of the extracted solvent under such circumstances.

The lixiviation stage of this process, or scalding conveyor, is followed by a series of low-pressure rolls exerting moderate compression on the fiberous material, up to 14 Bar. Preferably, two rolls are working together in which the lower roll is equipped with a cylindrical surface perforated to allow proper drainage of the solvent fluid from the fiberous material. The pressure to the fiberous material is exerted with the use of the top roller and is obtained with a hydraulic system acting upon the shaft of the top roller.

The fiberous material leaving each of these low-pressure units is macerated with solvent received from the low-pressure units downstream in a manner basically comparable to the compound imbibition system used in conventional mill tandems for sugar cane extraction. However, a special diverting and metering system for the solvent material obtained in each pressing step is allowing for a reflux of solvent to each preceding maceration carrier, which are transferring the fiberous material from one low-pressure step to the other. This feature has the objective to obtain highest maceration of the fiberous material—up to and above the maximum absorption capability of the latter—and with it to increase the flow rate of the solvent and, consequently, improve the displacement effect in each step and extraction.

After the use of several low-pressure displacement and maceration units, a conventional high-pressure system is applied for the dewatering of the fiberous material leaving the process. For this purpose, a conventional, 3-roller mill as used in the sugar industry can be used; but also screw presses or other devices suitable for application can be used. The preferred form for final dewatering of fiberous material—in particular sugar cane—would be a 3-roller, high-pressure mill with a pre-dewatering device constructed similar to low-pressure units, however, equipped with rollers of a smaller diameter to allow location of said pre-dewatering device close to the housing of a high-pressure, 3-roller mill; so the pre-dewatering unit can also act as a force-feeding device for the high-pressure mill.

The combination of pre-dewatering device and a high-pressure mill allows for application of imbibition as solvent after the last low-pressure displacement unit without jeopardizing efficiency or capacity of the final high-pressure unit. The pre-dewatering unit can hereby be directly driven by the high-pressure mill.

As previously indicated in this description, the embodiment visualized is allowing for progressingly increased application of pressure in the low-pressure displacement steps concomitant with the requirement for adequate displacement of the soluble material from fiberous material with its mounting resistance to release soluble material from unbroken cells.

The arrangement of this extraction process is providing for a rather short overall extraction time, not exceeding 15 minutes. Procedures for startup and liquidation are short allowing for high flexibility and avoiding loss of extraction due to deterioration of matters involved or insufficient exhaustion of fiberous material leaving this process.

To maintain the necessary temperatures during all phases of the extraction process and in the various operational modes, heating devices are provided for the heating of imbibition water or other solvent material and for the reheating of residual fluid obtained from the final high-pressure step.

Good extraction results with an extracted solvent flow of no more than 100 percent of the raw material can be achieved with low imbibition rates.

Figure 1B:
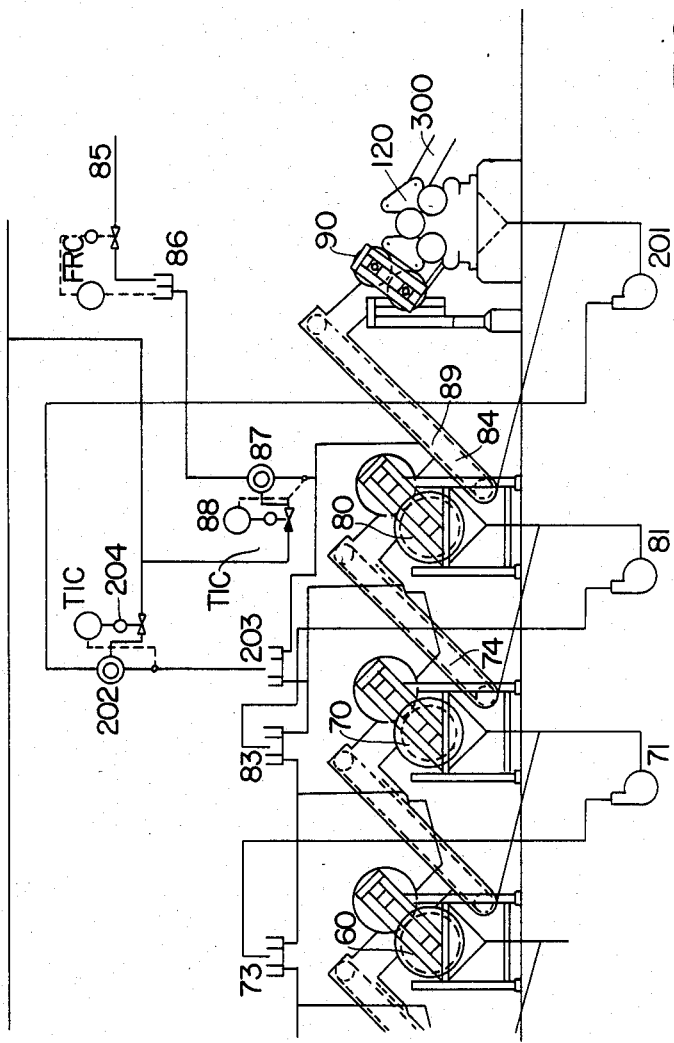

Referring to FIG. 1, cane is received by conventional preparation equipment consisting of knife sets and a fiberizer. Hereby, various arrangements may be possible all having the objectives to reduce the amount of unbroken cells to a minimum and to establish the most favorable premises for the following extraction process.

The disintegrated fiberous material is fed to fiberizer 10, and from there it is transferred directly to scalding conveyor 11. The latter is equipped with a transport system consisting of chains 12 able to carry the fiberous material at an adequate speed providing hereby a bed of fiberous material. Formation of said bed is improved by leveler 13 in the upper part of scalding conveyor 11.

After leveling, the fiberous material first comes into contact with liquid flow taken from compartment 14 and conveyed via pump 15 to distributor 16. Hereby, the fiberous material is supersaturated with liquid; and its liquid surplus is collected in compartment 17 from whence it is conveyed via pump 18 to distributor 19. From there, the liquid percolates again through the fiberous material and is finally collected in compartment 20. It is conveyed from there to vibrating screen 21 where foreign matter is separated. The latter is then returned to the lower section of scalding conveyor 11. The fabrication juice obtained after passing screening device 21 leaves the extraction processes via line 22 and pump 23.

The areas above compartments 17 and 20 are provided with a screen area allowing drainage of liquid. Likewise, area 24 perpendicular and below distributor 16 is equipped with perforated screens having the objective to transfer liquids discharged by distributor 16 directly to the lower plenum of the scalding system in case that there is no fiberous material received and conveyed over the upper part of the scalding conveyor absorbing liquid.

The juice flow discharged by distributor 16 comes in contact with fibrous material having ambient temperature; and therefore, the juice collected in compartments 17 and, finally, 20 has a temperature which is substantially below the process temperature of the extraction system; the latter is under normal conditions 76° C. The temperature of the extracted fluid 22 can be reduced by approximately 30° C. The compartment 25 provides liquid for recycling circuit 26, which is established with pump 27. Liquid flow 26 goes through heater 28 with automatic temperature control 29.

The heated liquid is discharged by several distributors 30 above the fiberous material and carried over the lower portion of the conveyor system, which is also equipped with perforated screens for liquid drainage. The liquid level in compartments 14, 25, and 31 is controlled under normal working conditions with level control 32'. The compartments 14, 25, and 31 are interconnected maintaining the same liquid level hereby avoiding mixing of the liquid between them. The volume, or storage capacity, of these 3 compartments 14, 25, and 31 is large enough to provide for the liquid needed for full maceration of the incoming fiberous material or for the storage of surplus liquid in case of a momentary lack of incoming fiberous material.

Liquid extracted from compartment 31 feeds recycling circuit 32, which is sustained by pump 33. This juice is heated by tubular heaters 34 with automatic temperature control 35 and returned over the fiberous material via distributors 36. The liquid discharged by these distributors is collected in compartment 31 and compartment 25. The collecting areas above compartment 25 and 31 can be relatively altered with flap 37.

The juice extracted in the first low-pressure unit 40 returns via pump 41 to distributor 38; and after percolating through the fiberous material, it is collected in compartment 31. The juice extracted in the second low-pressure unit 50 is taken via pump 51 and conveyed via direct contact heater 52 to diverter box 53.

The auxiliary heater 52 can be a direct contact heater and is equipped with an automatic temperature control 54. The construction of diverter 53 is shown in detail in FIG. 3. This unit has the objective to distribute the liquid extracted by low-pressure system 50 in adequate proportions to distributor 55 in the scalding conveyor and to distributor 42 located on the discharge side of low-pressure unit 40 on top of maceration carrier 43.

The liquid discharged by distributor 55 is percolated through the fiberous material and hence collected in compartment 39 from whence it flows by gravity to distributor 38. Liquid diverter 53 is devised to return enough liquid to distributor 42 to assure complete maceration of the fiberous material in the maceration carrier 43. This carrier is also equipped with a screen area 44 located in the upper part of the unit having the objective to return excess fluid by gravity to distributor 42.

The low-pressure units 60, 70, and 80 are operating in a similar manner as previously explained utilizing liquid diverters 63, 73, and 83 to accomplish full maceration between low-pressure applications.

Imbibition water 85 is controlled with measuring device 86 and is heated with direct contact heater 87. The latter is also equipped with an automatic temperature control 88. Imbibition water is then discharged via distributor 89 on top of carrier 84, which transfers the fiberous material to pre-dewatering device 90 and from there to 3-roller, high-pressure mill 120. Exhausted fiberous material leaves high-pressure mill 120 over chute 300.

The liquid extracted by pressing devices 90 and 120 is transferred with pump 201 via direct contact heater 202 to splitter box 203. The direct contact heater 202 is also equipped with an automatic temperature controller 204. Splitter box 203 permits distribution of extraction liquid in a constant proportion over maceration carrier 74 and carrier 84.

Figure 2:
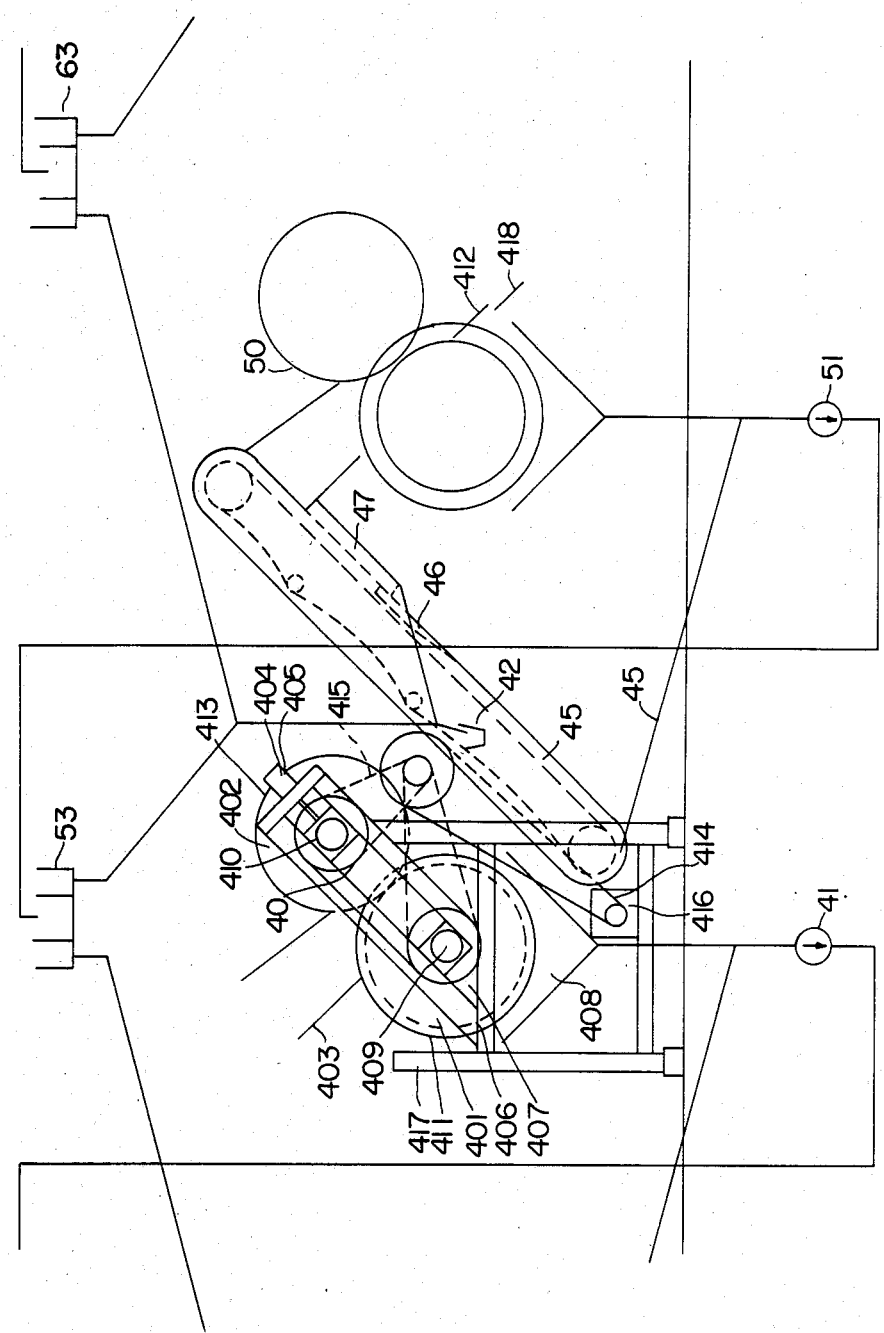
FIG. 2 is a side view in section of one of the low-pressure devices and a maceration carrier with associated parts.

FIG. 2 shows in more detail a typical low-pressure extraction unit as previously described in FIG. 1 under positions 40, 50, 60, 70, and 80. Also shown in FIG. 2 is a typical maceration carrier 43 providing transfer of fiberous material from one low-pressure unit to another. Rollers 401 and 402 are located in a steel structure permitting roller 402 to float in the axial plane in accordance with the thickness of the bed of fiberous material fed via chute 403 at the entrance of the upper unit.

The pressure exerted from roller 402 to roller 401 is controlled by 2 hydraulic units 404 and 405. The cylindrical surface 406 of roller 401 is perforated permitting drainage of liquid into the inner plenum 407 of roller 401. Both rollers are internally stiffened to resist the pressure exerted upon them. Furthermore, roller 401 has sub-divisions so that the liquid can leave the inner plenum of said roller in each direction.

Liquid is finally collected in tray 408 and taken from there with pump 41 to the previous maceration step. The axial plane of both rollers is inclined by approximately 50° from the vertical. Self-aligning pairs of roller bearings 409 and 410 are used for the roller shafts. The roller 401 is axially slightly wider than upper roller 402 and is provided with rings 411 on both ends to avoid spilling of fiberous material and liquid over the side of lower roll 401.

Scraper 412 acts upon roller surface 406 to avoid accumulation of fiberous material. Roller surface 413 of top roller 402 is provided with chevron-like elements to improve friction between fiberous material and roller surfaces.

Rollers 401 and 402 are separately driven via chain drives 414 and 415, and respective gears 416 are located on the ground floor. The steel structure 417 is designed to also support the adjacent maceration carriers, auxiliary equipment, and gangways. The low-pressure units are driven with constant speed motors.

Maceration carrier 43 receives the fiberous material from the low-pressure unit via chute 418, which is a prolongation of scraper 412. Above this area is located distributor 42. Maceration takes place below this area and in the lower part of maceration carrier 43.

As described in FIG. 1, the upper part of maceration carrier 43 is equipped with drainage area 44, which is again connected with distributor 42. In case that some free liquid is collected in the bottom part of the maceration carrier 43, this liquid can be drained off via conduit 45 to pump 51. The bottom part of maceration carrier 43 in area 44 is provided with lifting slats 46, which are located longitudinally facilitating the drainage of free liquid through drainage area 44.

The hydraulic units 404 and 405 permits a variation of pressure which can be exerted by the low-pressure units.

Figure 3A:
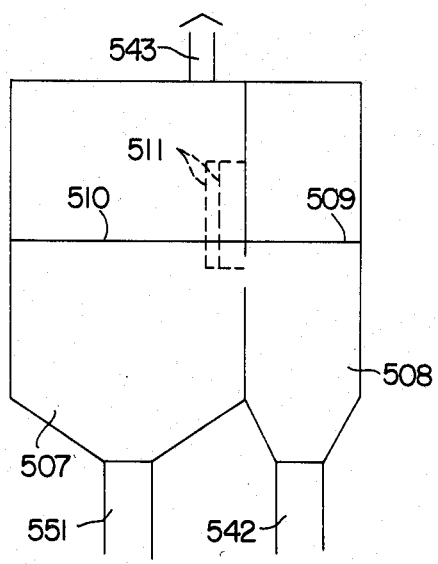
FIGS. 3a, 3b and 3c are showing design of a weir box generally used to achieve optimum maceration under a wide operational range.
Figure 3B:
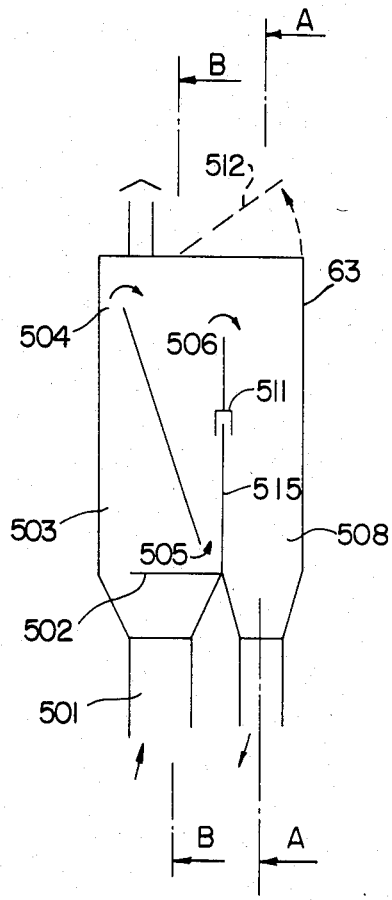
Figure 3C:
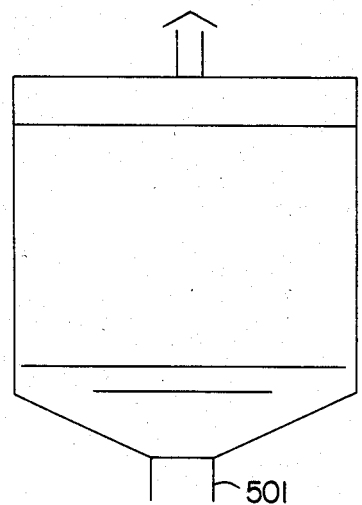

FIG. 3 shows a liquid diverter as shown in FIG. 1 under positions 53, 63, 73, and 83. Typically, the liquid is received from pump 61 through pipe conduit 501 and distributed by plate 502 to space 503 in which air bubbles contained in the fluid are separated and can escape through gap 504. Liquid can flow via gap 505 to space 506 flowing over weir 507 into areas 508 where they are diverted through distributors 542 and 551.

The horizontal length of the overflow weir parts 509 and 510 is directly related to the proportion of liquids discharged to distributors 542 and 551. This proportion can be altered by changing the length of the weirs 509 and 510, locating blinders 511 on the weirs. Diverter box 63 is fully enclosed having an access door 512 and a vent pipe 543.

The foregoing explanations should make the advantages of the invention sufficiently apparent. A most important component of the system is the scalding conveyor allowing for high lixiviation combined with the possibility to draw off liquid with a minimum of contamination so that it can be most suitable for the following production processes. Likewise, it offers the heat exchange—draw-off liquid versus raw material—which can facilitate the following thermophysical processes. Hereby, heat requirement for the extraction system can be reduced by 25% to 35% in comparison with a diffusion system not equipped with this feature.

The scalding conveyor in spite of all these functions offers high flexibility in operation.

The low-pressure and maceration phases following the scalding conveyor are simple in construction. Their energy consumption is rather low in comparison with the conventional mill operation, and propulsion can be achieved with constant speed drivers. Hydraulic systems allow for adjustments of pressures over a wide low-pressure range.

The utilization of a pre-dewatering device in combination with a high pressure mill is also a basic feature of this invention and can yield substantial technological advantages. The components as described above for lixiviation, maceration, and compression can also be used separately in combination with existing extraction systems, diffusers, or mill tandems to which the individual units are highly adaptable.

The invention herein disclosed is illustrative, showing only one example of its application. Therefore, the scope of the invention should not be limited thereby. It is intended that the appended claims be construed as broadly as may be permitted by the prior art.

What is claimed is:

1. Apparatus for extracting saccharose from comminuted vegetable material, comprising:
    (a) means for lixiviating said material to extract saccharose and leave a first stage bagasse;
    (b) means for passing said first stage bagasse to a first low pressure compression means;

(c) first low pressure compression means for compressing said first stage bagasse, and for passing said first stage bagasse to a first maceration means;

(d) means for draining a first expressed fluid;

(e) means for recycling said first expressed fluid to said lixiviation means;

(f) first maceration means for adding expressed fluid from subsequent low pressure compression means to said second stage bagasse to produce a first macerate, and for passing said first macerate to a second low pressure compression means;

(g) second low pressure compression means for compressing said first macerate to express a second fluid and produce a third stage bagasse, and for passing said third stage bagasse to a second maceration means;

(h) means for draining said second expressed fluid;

(i) means for recycling a variable portion of said second expressed fluid to said lixiviation means, and for recycling the remainder to said first maceration means;

(j) second maceration means for adding expressed fluid from a subsequent low pressure compression means to produce a second macerate, and for passing said second macerate to a third low pressure compression means;

(k) a third low pressure compression means for compressing said second macerate to express a third fluid and produce a fourth stage bagasse, and for passing said fourth stage bagasse to a subsequent maceration means;

(l) means for draining said third expressed fluid;

(m) means for recycling a variable portion of said third expressed fluid to said second maceration means, and for recycling the remainder to at least one of said first maceration means and said lixiviation means;

(n) at least one additional sequence of maceration means, low pressure compression means, drainage means, and recycling means, each recycling means comprising means for recycling a variable portion of expressed liquid from its corresponding low pressure compression means to the maceration means immediately preceding said low pressure compression means, and for recycling the remainder to at least one of the lixiviation means and the maceration means preceding the previous low pressure compression means;

(o) means for passing a final stage bagasse from the final maceration means to a high pressure dewatering means;

(p) high pressure dewatering means for dewatering said final macerate to express a final fluid;

(q) means for draining said final expressed fluid; and (r) means for recycling a variable portion of said final expressed fluid to said final maceration means, and for recycling the remainder to at least one of the lixiviation means and the maceration means preceding the final low pressure compression means, wherein each low pressure compression means comprises opposed upper and lower compression surfaces, one of which is provided with openings therein for conducting a portion of the expressed liquid therethrough during the compression operation, and wherein each recycling means comprises container means for accepting expressed liquid, said container means comprising a feed space and two discharge spaces, and a pair of overflow weirs separating the feed space from the discharge spaces.

2. An apparatus according to claim 1, characterized by the fact that the upper edge of the weirs are the same height and blinder means on at least one of the weirs, said blinder means determining the weir length and thereby a distribution ratio of the recycle.

3. An apparatus according to claim 1, characterized by the fact of blinder means on the top of one of the weirs.

4. An apparatus according to claim 1 characterized by the fact that each low pressure compression means consists essentially of a single pair of rollers.

5. Apparatus according to claim 1 wherein each low pressure compression means is adapted to exert pressure less than that of the next succeeding low pressure compression means.

6. A method of extracting saccharose from comminuted fibrous plant stalk material comprising:

(a) subjecting said material to lixiviation to extract saccharose and leave a first stage bagasse, the saccharose extract being recovered;

(b) passing said bagasse to a first low pressure compression step with drainage of a first expressed fluid and formation of a second stage pagasse;

(c) recycling said first expressed fluid to lixiviation step (a);

(d) passing said second stage bagasse to a first maceration step wherein expressed fluid from a subsequent low pressure compression step is added to produce a first macerate;

(e) passing said first macerate to a second low pressure compression step with drainage of a second expressed fluid and formation of a third stage bagasse;

(f) recycling a variable portion of said second expressed fluid to lixiviation step (a) and recycling the remainder to first maceration step (d);

(g) passing said third stage bagasse from step (e) to a second maceration step wherein expressed fluid from a subsequent low pressure compression step is added to produce a second macerate;

(h) passing said second macerate to a third low pressure compression step with drainage of a third expressed fluid and formation of a fourth stage bagasse;

(i) recycling a variable portion of said third expressed fluid to second maceration step (g), and recycling the remainder to at least one of first maceration step (d) and lixiviation step (a);

(j) repeating at least once the sequence as in steps (g), (h), and (i), wherein a variable portion of expressed fluid from a low pressure compression step is recycled to the maceration step immediately preceding said low pressure compression step, and the remainder is recycled to at least one of lixiviation step (a) and the maceration steps preceding the previous low pressure compression step;

(k) passing the final macerate from the final maceration step to a high pressure dewatering step with drainage of a final expressed fluid; and (l) recycling a variable portion of said final expressed fluid to said final maceration step, and recycling the remainder to at least one of lixiviation step (a) and the maceration steps preceding the final low pressure compression step.

7. A method according to claim 6, wherein the expressed fluid is recycled, in steps (f), (i), (j) and (l), in a ratio of 20:80% to 40:60%, the smaller percentage referring to the portion recycled to the maceration step immediately preceding the pressure step at which said fluid is expressed.

8. A method according to claim 6, characterized by the fact that the bagasse, during said compression steps, is pressed between moving pressing surfaces of a single pair of rollers which form a press nip between them, one of the rollers being provided with openings therein for conducting a portion of the expressed liquid therethrough during the compressing steps.

9. A process according to claim 6 wherein excess fluid from each maceration step preceding the final maceration step is added to the fluid from the next succeeding low pressure compression step, and wherein excess fluid from the final maceration step is added to the fluid from high pressure dewatering step (k).

10. A process according to claim 6 wherein the pressure utilized in said low pressure compression steps is below 14 Bar.

11. A process according to claim 6 wherein the pressure utilized in each low pressure compression step is less than that in the next succeeding low pressure compression step.

* * * * *